United States Patent
Koo et al.

(10) Patent No.: US 9,860,555 B2
(45) Date of Patent: Jan. 2, 2018

(54) METHOD AND APPARATUS FOR PROCESSING VIDEO SIGNAL

(71) Applicant: LG ELECTRONICS INC., Seoul (KR)

(72) Inventors: Moonmo Koo, Seoul (KR); Jiwook Jung, Seoul (KR); Sehoon Yea, Seoul (KR); Jin Heo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 295 days.

(21) Appl. No.: 14/402,240

(22) PCT Filed: May 22, 2013

(86) PCT No.: PCT/KR2013/004491
§ 371 (c)(1),
(2) Date: Nov. 19, 2014

(87) PCT Pub. No.: WO2013/176485
PCT Pub. Date: Nov. 28, 2013

(65) Prior Publication Data
US 2015/0288983 A1    Oct. 8, 2015

Related U.S. Application Data

(60) Provisional application No. 61/650,468, filed on May 22, 2012.

(51) Int. Cl.
*H04N 19/56* (2014.01)
*H04N 19/597* (2014.01)
(Continued)

(52) U.S. Cl.
CPC .......... *H04N 19/56* (2014.11); *H04N 19/573* (2014.11); *H04N 19/597* (2014.11); *H04N 19/625* (2014.11); *H04N 19/82* (2014.11)

(58) Field of Classification Search
CPC ...... H04N 19/56; H04N 19/573; H04N 19/82; H04N 19/625; H04N 19/597; H04N 19/52;
(Continued)

(56) References Cited

U.S. PATENT DOCUMENTS

| | | | |
|---|---|---|---|
| 7,489,342 B2 * | 2/2009 | Xin | H04N 19/597 348/218.1 |
| 7,561,620 B2 * | 7/2009 | Winder | H04N 13/0011 348/700 |

(Continued)

FOREIGN PATENT DOCUMENTS

| | | |
|---|---|---|
| JP | 2012-016046 A | 1/2012 |
| KR | 10-2011-0113583 A | 10/2011 |
| WO | 2010-017166 A2 | 2/2010 |

OTHER PUBLICATIONS

Sang Heon Lee et al., 'A Motion Vector Prediction Method for Multi-View Video Coding, In: International Conference on Intelligent Information Hiding and Multimedia Signal Processing, 2008. 08.15.17, pp. 1247-1250.

*Primary Examiner* — Dramos I Kalapodas
(74) *Attorney, Agent, or Firm* — Dentons US LLP

(57) ABSTRACT

The present invention relates to a method for processing a video signal, comprising the step of inducing an inter-view motion vector of a current texture block by considering priorities between inter-view motion vector candidates of the current texture block, wherein the inter-view motion vector candidates include an inter-view motion vector of a spatial neighboring block, an inter-view motion vector of a temporal neighboring block and/or a reference inter-view (Continued)

motion vector, and inter-view inter prediction is performed by using the induced inter-view motion vector. The present invention can increase the accuracy of the inter-view inter prediction by selectively using the inter-view motion vector of a spatial neighboring block, the inter-view motion vector of a temporal neighboring block and/or the reference inter-view motion vector to induce an accurate inter-view motion vector, and can improve coding efficiency by reducing the amount of residual data to be transmitted.

8 Claims, 10 Drawing Sheets

(51) Int. Cl.
*H04N 19/625* (2014.01)
*H04N 19/82* (2014.01)
*H04N 19/573* (2014.01)

(58) Field of Classification Search
CPC ............ H04N 19/436; H04N 19/513; H04N 19/00684; H04N 19/103; H04N 19/139; H04N 19/176; H04N 19/182; H04N 19/30; H04N 19/46; H04N 19/521; H04N 19/577; H04N 19/583; H04N 19/61; H04N 19/172; H04N 19/184; H04N 19/55; H04N 19/593; H04N 7/26872; H04N 19/105; H04N 19/615; H04N 19/63; H04N 19/13; H04N 19/70; H04N 19/00769; H04N 19/503; H04N 19/119; H04N 19/00593; H04N 19/00533; H04N 19/00733; H04N 13/0048; H04N 19/33; H04N 19/196; H04N 19/463; H04N 19/197
See application file for complete search history.

(56) References Cited

U.S. PATENT DOCUMENTS

| | | | | |
|---|---|---|---|---|
| 7,929,610 B2* | 4/2011 | Sun | ............... | H04N 19/139 375/240.12 |
| 8,630,346 B2* | 1/2014 | Chappalli | ............... | H04N 19/51 375/240.12 |
| 9,485,503 B2* | 11/2016 | Zhang | ............... | H04N 19/50 |
| 2004/0008784 A1* | 1/2004 | Kikuchi | ............... | H04N 19/573 375/240.16 |
| 2006/0146141 A1* | 7/2006 | Xin | ............... | H04N 19/597 348/211.7 |
| 2007/0030356 A1* | 2/2007 | Yea | ............... | H04N 13/0242 348/207.99 |
| 2007/0109409 A1* | 5/2007 | Yea | ............... | H04N 7/181 348/153 |
| 2007/0121722 A1* | 5/2007 | Martinian | ............... | H04N 19/597 375/240.12 |
| 2007/0146143 A1* | 6/2007 | Cote | ............... | G06K 19/07749 340/572.8 |
| 2007/0211802 A1* | 9/2007 | Kikuchi | ............... | H04N 19/573 375/240.16 |
| 2009/0290643 A1* | 11/2009 | Yang | ............... | H04N 19/00769 375/240.16 |
| 2010/0118939 A1 | 5/2010 | Shimizu et al. | | |
| 2010/0322311 A1* | 12/2010 | Vetro | ............... | H04N 19/597 375/240.12 |
| 2011/0194452 A1* | 8/2011 | Orlik | ............... | H04N 19/597 370/252 |
| 2011/0216833 A1* | 9/2011 | Chen | ............... | H04N 13/0022 375/240.16 |
| 2012/0075436 A1* | 3/2012 | Chen | ............... | H04N 19/597 348/51 |
| 2012/0236941 A1* | 9/2012 | Lin | ............... | H04N 19/52 375/240.16 |
| 2012/0269271 A1* | 10/2012 | Chen | ............... | H04N 19/597 375/240.16 |
| 2013/0176390 A1* | 7/2013 | Chen | ............... | H04N 19/597 348/43 |
| 2013/0287108 A1* | 10/2013 | Chen | ............... | H04N 19/597 375/240.16 |
| 2014/0071235 A1* | 3/2014 | Zhang | ............... | H04N 19/597 348/43 |
| 2014/0098882 A1* | 4/2014 | Zhang | ............... | H04N 13/0048 375/240.16 |
| 2014/0241434 A1* | 8/2014 | Lin | ............... | H04N 19/597 375/240.16 |
| 2015/0264395 A1* | 9/2015 | Tourapis | ............... | H04N 19/597 375/240.16 |

* cited by examiner

FIG. 3
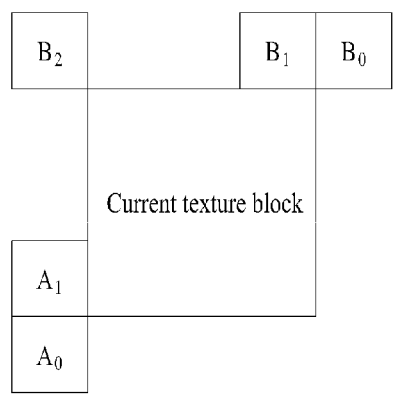
(a)
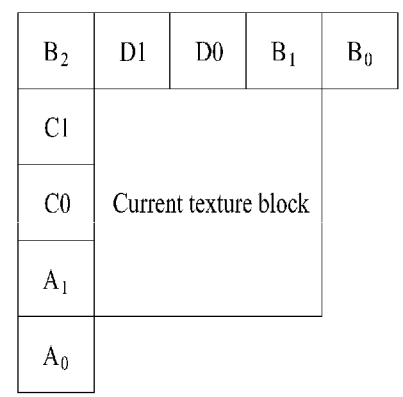
(b)

METHOD AND APPARATUS FOR PROCESSING VIDEO SIGNAL

This application is a National Stage Entry of International Application No. PCT/KR2013/004491 filed May 22, 2013, and claims the benefit of U.S. Provisional Application No. 61/650,468 filed May 22, 2012, both of which are hereby incorporated by reference for all purposes as if fully set forth herein in their entireties.

TECHNICAL FIELD

The present invention relates to a method and apparatus for processing a video signal.

BACKGROUND ART

Compression refers to a signal processing technique for transmitting digital information through a communication line or storing the digital information in a form suitable for a storage medium. Subjects of compression include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention derives an inter-view motion vector of the current texture block on the basis of one of an inter-view motion vector and a disparity vector of a neighboring block.

The present invention derives the inter-view motion vector of the current texture block in consideration of priorities of candidates including the inter-view motion vector and the disparity vector of the neighboring block.

The present invention derives an inter-view motion vector from a block coded according to temporal inter-prediction using a reference view motion vector as well as an inter-view motion vector of a block coded according to inter-view inter-prediction from among neighboring blocks of the current texture block and uses the derived inter-view motion vector as an inter-view motion vector candidate of the current texture block.

Spatial neighboring blocks according to the present invention include at least one of a left lower neighboring block, a left neighboring block, a right upper neighboring block, an upper neighboring block and a left upper neighboring block of the current texture block, and a block coded according to inter-view inter-prediction is detected in consideration of priorities of the spatial neighboring blocks to acquire a spatial inter-view motion vector.

Temporal neighboring blocks according to the present invention include at least one of a collocated block and a neighboring block adjacent to the collocated block, and a block coded according to inter-view inter-prediction is detected in consideration of priorities of the temporal neighboring blocks to acquire a temporal inter-view motion vector.

Advantageous Effects

The present invention can improve video data prediction accuracy using correlation between views by performing inter-view inter-prediction using an inter-view motion vector. In addition, a correct inter-view motion vector can be derived by selectively using one of an inter-view motion vector of a spatial neighboring block, an inter-view motion vector of a temporal neighboring block, a reference inter-view motion vector and a disparity vector as the inter-view motion vector so as to improve inter-view inter-prediction accuracy, and coding efficiency can be enhanced by reducing the amount of transmitted residual data. Furthermore, a reference inter-view motion vector corresponding to a reference view motion vector is used as a candidate even in the case of a block coded according to temporal inter-prediction as well as a block coded according to inter-view inter-prediction from among spatial neighboring blocks or temporal neighboring blocks, thereby predicting an accurate inter-view motion vector. Moreover, priority is determined for a plurality of inter-view motion vector candidates and blocks, which are coded according to inter-view inter-prediction, are sequentially searched according to the priority, thereby reducing complexity of a process of deriving an inter-view motion vector.

DESCRIPTION OF DRAWINGS

FIG. 3 illustrates exemplary spatial neighboring blocks according to an embodiment to which the present invention is applied.

BEST MODE

According to one aspect of the present invention, there is provided a method for processing a video signal, which includes: deriving an inter-view motion vector of a current texture block from one of inter-view motion vector candidates of the current texture block in consideration of priorities of the inter-view motion vector candidates; and performing inter-view inter-prediction on the current texture block using the derived inter-view motion vector, wherein the inter-view motion vector candidates include at least one of inter-view motion vectors of spatial neighboring blocks, inter-view motion vectors of temporal neighboring blocks and a reference inter-interview motion vector.

When at least one of the spatial neighboring blocks and the temporal neighboring blocks is derived from a reference view motion vector, the reference inter-view motion vector is an inter-view motion vector corresponding to the reference view motion vector.

MODES FOR INVENTION

Techniques of compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include encoding and decoding in the specification can be flexibly interpreted in the technical spirit and technical scope of the present invention.

Figure 1:
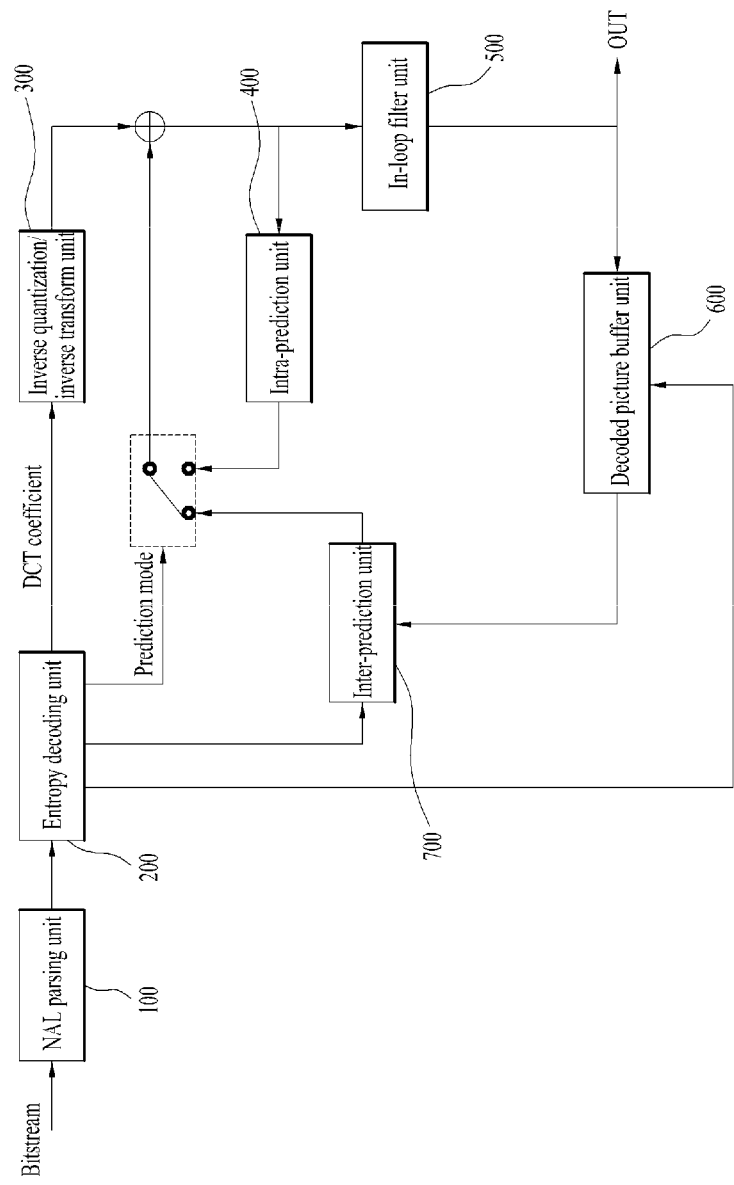
FIG. 1 is a block diagram of a video decoder according to an embodiment to which the present invention is applied.

FIG. 1 is a block diagram of a video decoder according to an embodiment to which the present invention is applied.

Referring to FIG. 1, the video decoder may include a NAC parsing unit 100, an entropy decoding unit 200, an inverse quantization/inverse transform unit 300, an intra-prediction unit 400, an in-loop filter unit 500, a decoded picture buffer unit 600 and an inter-prediction unit 700. The NAL parsing unit 100 may receive a bitstream including multiview texture data. In addition, the NAL parsing unit 100 may further receive a bitstream including encoded depth data when the depth data is necessary for texture data coding. The input texture data and depth data may be transmitted as one bitstream or transmitted as separate bitstreams. The NAL parsing unit 100 may perform parsing on a NAL basis in order to decode the input bitstream. When the input bitstream is multiview related data (e.g. 3-dimensional video), the input bitstream may further include a camera parameter. The camera parameter may include an intrinsic camera parameter and an extrinsic camera parameter, and the intrinsic camera parameter may include a focal length, an aspect ratio, a principal point and the like and the extrinsic camera parameter may include camera position information in the global coordinate system and the like.

The entropy decoding unit 200 may extract a quantized transform coefficient, coding information for texture picture prediction and the like through entropy decoding.

The inverse quantization/inverse transform unit 300 may acquire a transform coefficient by applying a quantization parameter to the quantized transform coefficient and decode the texture data or the depth data by inversely transforming the transform coefficient. Here, the decoded texture data or depth data may include residual data according to prediction. In addition, a quantization parameter for a depth block may be set in consideration of complexity of the texture data. For example, a low quantization parameter can be set when a texture block corresponding to the depth block has a high complexity and a high quantization parameter can be set when the texture block has a low complexity.

The intra-prediction unit 400 may perform intra-prediction using reconstructed texture data in the current texture picture. Intra-prediction may be performed for the depth picture in the same manner as that for the texture picture. For example, coding information used for inter-prediction of the texture picture can be equally used for the depth picture. The coding information used for inter-prediction may include an intra-prediction mode and partition information of intra-prediction.

The in-loop filter unit 500 may apply an in-loop filter to each coded block in order to reduce block distortion. The filter may smooth the edge of a block so as to improve the quality of a decoded picture. Filtered texture pictures or depth pictures may be output or stored in the decoded picture buffer unit 600 to be used as reference pictures.

The decoded picture buffer unit 600 may store or open previously coded texture pictures or depth pictures in order to perform inter-prediction. To store previously coded texture pictures or depth pictures in the decoded picture buffer unit 600 or to open the pictures, frame_num and a picture order count (POC) of each picture may be used. Furthermore, since the previously coded pictures include depth pictures corresponding to views different from the view of the current depth picture in depth coding, view identification information for identifying a depth picture view may be used in order to use the depth pictures corresponding to different views as reference pictures. In depth coding, depth pictures may be marked to be discriminated from texture pictures in the decoded picture buffer unit and information for identifying each depth picture may be used during the marking process.

The inter-prediction unit 700 may perform motion compensation of a current block using reference pictures and motion information stored in the decoded picture buffer unit 600. The motion information may include a motion vector and reference index information in a broad sense in the specification. In addition, the inter-prediction unit 700 may perform temporal inter-prediction for motion compensation. Temporal inter-prediction may refer to inter-prediction using reference pictures, which correspond to the same view as the current texture block while corresponding to a time period different from that of the current texture block, and motion information of the current texture block. In the case of a multiview image captured by a plurality of cameras, inter-view inter-prediction may be performed in addition to temporal inter-prediction. Inter-view inter-prediction may refer to inter-prediction using reference pictures corresponding to views different from that of the current texture block and motion information of the current texture block. For convenience, motion information used for inter-view prediction is referred to as an inter-view motion vector and inter-view reference index information. Accordingly, motion information can be flexibly interpreted as information including the inter-view motion vector and inter-view reference index information in the specification. A description will be given of a method for deriving motion information of the current texture block, particularly, a motion vector in the inter-prediction unit 700.

Figure 2:
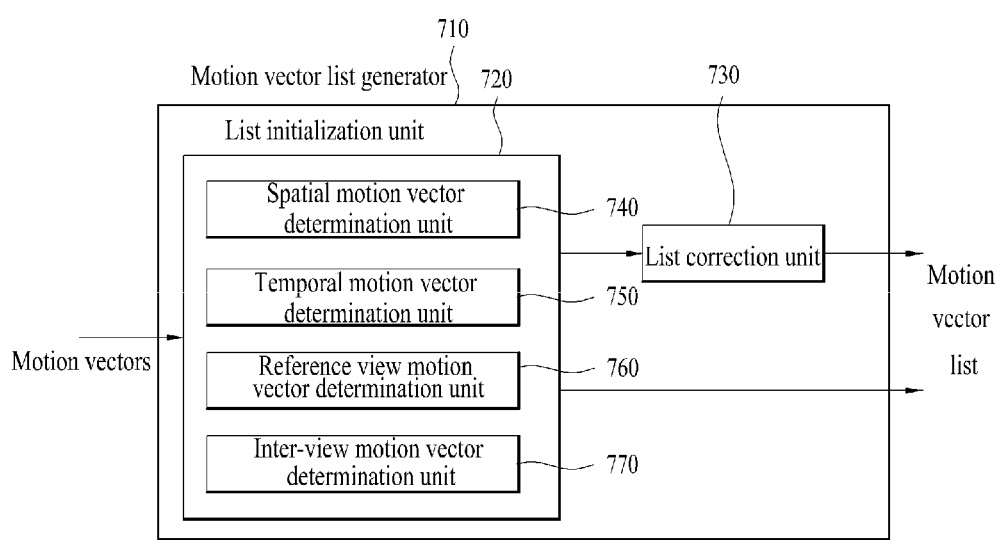
FIG. 2 illustrates a configuration of a motion vector list generator according to an embodiment to which the present invention is applied.

FIG. 2 illustrates a configuration of a motion vector list generator according to an embodiment to which the present invention is applied.

The motion vector list generator 710 may be included in the inter-prediction unit 700 of the decoder. The motion vector list generator 710 may be composed of a list initialization unit 720 and a list correction unit 730. The list initialization unit 720 may generate a motion vector list including motion vector candidates. Here, the motion vector candidates may refer to a set of motion vectors of the current texture block or motion vectors which can be used as predicted motion vectors. A motion vector candidate according to the present invention may include at least one of a spatial motion vector, a temporal motion vector and a reference view motion vector and an inter-view motion vector. The spatial motion vector, the temporal motion vector, the reference view motion vector and the inter-view motion vector included in the motion vector candidate are respectively acquired by a spatial motion vector determination unit 740, a temporal motion vector determination unit 750, a reference view motion vector determination unit 760 and an inter-view motion vector determination unit 770, which are included in the motion vector list initialization unit 720.

The spatial motion vector determination unit 740 may derive a spatial motion vector from a motion vector of a neighboring block which is spatially adjacent to the current texture block. For example, the spatially adjacent neighboring block may correspond to one of a left block, an upper block, a left lower block, a left upper block and a right upper block of the current texture block. When it is determined that the current texture block and a neighboring block have the same reference picture, a motion vector of the neighboring block having the same reference picture may be added to the motion vector list.

The temporal motion vector determination unit 750 may derive a temporal motion vector from a motion vector of a neighboring block which is temporally adjacent to the current texture block. For example, the temporally adjacent neighboring block may correspond to a collocated block, which is in the same position as the current texture block within a reference picture corresponding to the same view as that of the current texture block and located in a time period different from that of the current texture block, or a block adjacent to the collocated block of the current texture block. Here, the reference picture can be specified by reference index information of a picture including the collocated block.

The reference view motion vector determination unit 760 may derive a reference view motion vector from a motion vector of a corresponding block positioned at a view different from the current texture block. Here, the corresponding block may be a block indicated by an inter-view motion vector of the current texture block. For example, a corresponding block within a view can be specified using the inter-view motion vector of the current texture block and the motion vector of the specified block can be set as the reference view motion vector of the current texture block.

When temporal inter-prediction is performed using an inter-view motion vector of a spatial neighboring block or a temporal neighboring block of the current texture block coded according to inter-view inter-prediction, a disparity vector derived from a depth block of a depth picture, which corresponds to the current texture block, and a reference view motion vector of a neighboring block of the current texture block, the inter-view motion vector determination unit 770 may derive an inter-view motion vector indicating a reference block of the current texture block from an inter-view motion vector for determining a reference view motion vector.

The inter-view motion vector used to determine the reference view motion vector may be included in motion vector candidates of the current texture block to form the motion vector list. In this case, the inter-view motion vector may be included in the motion vector list in consideration of whether the reference picture of the current texture block corresponds to the same view as the current texture block or a different view. For example, when the reference picture of the current texture block corresponds to a view different from that of the current texture block, the inter-view motion vector can be added to the motion vector list. When the reference index information of the current texture block indicates a reference picture for inter-view prediction, the inter-view motion vector may be added to the motion vector list. Methods for deriving an inter-view motion vector according to the present invention will be described with reference to FIGS. 3 to 7.

The motion vector list generated by the list initialization unit 720 may be used as a final motion vector list for deriving the motion vector of the current texture block and may be corrected through the list correction unit 730 to remove redundancy of motion vector candidates. For example, the list correction unit 730 can check whether spatial motion vectors in the motion vector list generated by the list initialization unit 720 are identical. When identical spatial motion vectors are present, the list correction unit 730 may remove one of the identical spatial motion vectors from the motion vector list. Furthermore, when the number of motion vector candidates, which are left in the motion vector list after removal of redundancy of motion vector candidates in the motion vector list, is less than 2, the list correction unit 730 may add a zero motion vector. On the contrary, when the number of motion vector candidates, which are left in the motion vector list after removal of redundancy of motion vector candidates, is greater than 2, the list correction unit 730 may remove motion vector candidates except for 2 motion vector candidates from the motion vector list. Here, the 2 motion vector candidates left in the motion vector list may be candidates having lower list identification indexes in the motion vector list. A list identification index, which is allocated to each motion vector candidate included in the motion vector list, may refer to information for identifying each motion vector candidate.

A description will be given of a method of deriving the motion vector of the current texture block from the motion vector list in the inter-prediction unit 700.

Motion vector identification information about the current texture block may be extracted from the bitstream. The motion vector identification information may be information that specifies a motion vector candidate used as a motion vector or a predicted motion vector of the current texture block. That is, a motion vector candidate corresponding to the extracted motion vector identification information may be extracted from the motion vector list and set to the motion vector or predicted motion vector of the current texture block. When the motion vector candidate corresponding to the motion vector identification information is set to a predicted motion vector of the current texture block, a motion vector differential value may be used to reconstruct the motion vector of the current texture block. Here, the motion vector differential value may refer to a differential vector between the decoded motion vector and the predicted motion vector. Accordingly, the motion vector of the current texture block can be decoded using the predicted motion vector acquired from the motion vector list and the motion vector differential value extracted from the bitstream. Pixel values of the current texture block may be predicted using the decoded motion vector and a reference picture list. The reference picture list may include not only reference pictures for temporal inter-prediction but also reference pictures for inter-view inter-prediction. The inter-view motion vector described with reference to FIG. 2 may be derived from one selected from a spatial inter-view motion vector, a temporal inter-view motion vector, a disparity vector and a reference inter-view motion vector.

The spatial inter-view motion vector according to the present invention may be derived from a motion vector of a neighboring block which is coded according to inter-view inter-prediction from among spatial neighboring blocks of the current texture block. In other words, the spatial inter-view motion vector may be derived using a neighboring block having an inter-view motion vector from among spatial neighboring blocks of the current texture block, which will be described with reference to FIG. 3.

The temporal inter-view motion vector of the present invention may be derived from a motion vector of a neighboring block which is coded according to inter-view inter-prediction from among temporal neighboring blocks of the current texture block. In other words, the temporal inter-view motion vector may be derived using a neighboring block having an inter-view motion vector from among temporal neighboring blocks of the current texture block. Here, a temporal neighboring block may refer to a block in the same position as the current texture block or adjacent to the position of the current texture block within a reference picture having the same view as the current picture including the current texture block, which will be described with reference to FIG. 4.

The reference inter-view motion vector of the present invention may be derived from the inter-view motion vector for determining the reference view motion vector. In other words, when temporal inter-prediction is performed for a spatial neighboring block or a temporal neighboring block of the current texture block using the reference view motion vector, an inter-view motion vector corresponding to the reference view motion vector may be referred to as a reference inter-view motion vector.

The disparity vector according to the present invention may represent inter-view disparity in a multiview image. In the case of a multiview image, inter-view disparity according to camera position may be generated and the disparity vector may compensate for the inter-view disparity. A method of deriving the disparity vector will be described with reference to FIG. 5.

FIG. 3 illustrates exemplary spatial neighboring blocks according to an embodiment to which the present invention is applied.

Referring to FIG. 3(a), spatial neighboring blocks may include at least one of a left lower neighboring block $A_0$, a left neighboring block $A_1$, a right upper neighboring block $B_0$, an upper neighboring block $B_1$ and a left upper neighboring block $B_2$. The aforementioned spatial neighboring blocks may be searched for a block coded according to inter-view inter-prediction and an inter-view motion vector of the neighboring block coded according to inter-view inter-prediction may be set to an inter-view motion vector of the current texture block. The block coded according to inter-view inter-prediction may be detected in consideration of priorities of the spatial neighboring blocks. It is assumed that the priorities of the spatial neighboring blocks are set as shown in Table 1 when the block coded according to inter-view inter-prediction is detected.

TABLE 1

| Priority | Spatial neighboring block |
| --- | --- |
| 0 | Left lower neighboring block |
| 1 | Left neighboring block |
| 2 | Right upper neighboring block |
| 3 | Upper neighboring block |
| 4 | Left upper neighboring block |

Referring to Table 1, a lower priority value refers to a higher priority.

Accordingly, the spatial neighboring blocks may be searched in the order of the left neighboring block, upper neighboring block, right upper neighboring block, left lower neighboring block and left upper neighboring block for a block coded according to inter-view inter-prediction. For example, when the left neighboring block corresponds to a block coded according to inter-view inter-prediction, the inter-view motion vector of the left neighboring block can be set to the inter-view motion vector of the current texture block and searching can be ended. However, when the left neighboring block has not been coded according to inter-view inter-prediction, it can be checked whether the upper neighboring block has been coded according to inter-view inter-prediction. Alternatively, the spatial neighboring blocks may be searched in the order of the left lower neighboring block, left neighboring block, right upper neighboring block, upper neighboring block and left upper neighboring block for a block coded according to inter-view inter-prediction. However, priorities of the spatial neighboring blocks are not limited to the above-described embodiment.

A description will be given of a method for determining whether a neighboring block is coded according to inter-view inter-prediction. In one embodiment, it is possible to determine whether a neighboring block is coded according to inter-view inter-prediction on the basis of whether the corresponding neighboring block uses an inter-view reference picture list. The inter-view reference picture list may refer to a list composed of reference pictures positioned at views different from the view of the corresponding neighboring block. Alternatively, it may be determined whether a neighboring block is coded according to inter-view inter-prediction on the basis of reference index information of the corresponding neighboring block. For example, when the reference index information of the corresponding neighboring block specifies a reference picture located at a view different from that of the corresponding neighboring block, it can be specified that the corresponding neighboring block is coded according to inter-view inter-prediction. Alternatively, it may be determined whether a neighboring block is coded according to inter-view inter-prediction on the basis of whether POC of a picture including the corresponding neighboring block is identical to POC of a reference picture of the corresponding neighboring block. POC is output sequence information and pictures in the same access unit may have the same POC. Accordingly, when the two POCs are identical, this means that the picture including the corresponding neighboring block and the reference picture are located at different views. In this case, it can be specified that the corresponding neighboring block is coded according to inter-view inter-prediction.

FIG. 3(b) illustrates an expansion of spatial neighboring block candidates. When the size of the left neighboring block $A_1$ is less than the size of the current texture block, the current texture block may further have at least one left neighboring block. For example, the spatial neighboring blocks according to the present invention can further include left neighboring blocks $A_2$ and $A_3$ located between the left neighboring block $A_1$ and the left upper neighboring block $B_4$, as shown in FIG. 3(b). In the same manner, the spatial neighboring blocks according to the present invention can further include upper neighboring blocks $B_2$ and $B_3$ located between the upper neighboring block $B_1$ and the left upper neighboring block $B_4$ when the size of the upper neighboring block $B_1$ is less than the size of the current texture block. In this case, a block coded according to inter-view inter-prediction may also be detected in consideration of priorities of the spatial neighboring blocks (e.g. $A_1 \rightarrow B_1 \rightarrow B_0 \rightarrow A_0 \rightarrow B_2 \rightarrow C_0 \rightarrow C_1 \rightarrow D_0 \rightarrow D_1$). As described above, it is possible to increase the probability that the inter-view motion vector of the current texture block can be acquired by expanding spatial neighboring block candidates for deriving the inter-view motion vector of the current texture block.

Figure 4:
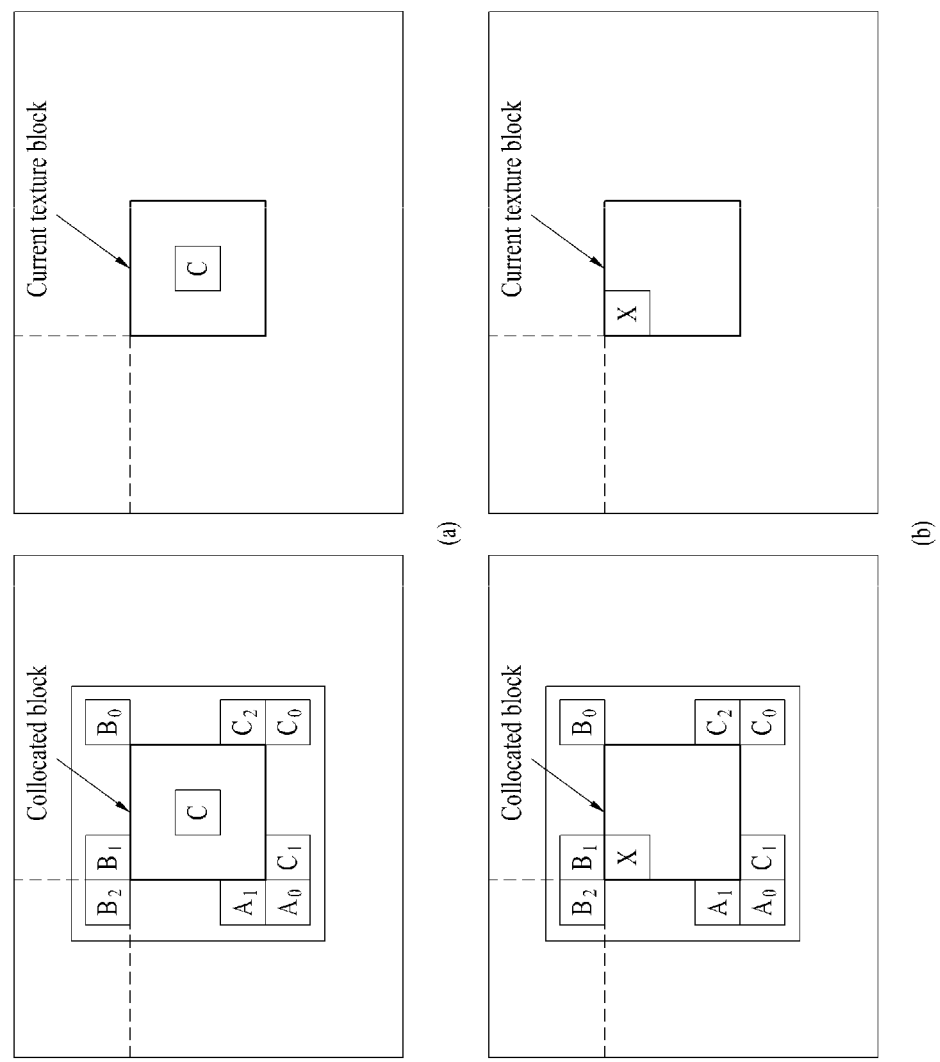
FIG. 4 illustrates exemplary temporal neighboring blocks according to an embodiment to which the present invention is applied.

FIG. 4 illustrates exemplary temporal neighboring blocks according to an embodiment to which the present invention is applied.

Referring to FIG. 4, a temporal neighboring block may refer to a block (referred to as a collocated block hereinafter) in the same position as the current texture block within a reference picture of the current texture block. Here, the reference picture may refer to a picture corresponding to the same view as the current picture including the current texture block while corresponding to a different time. The collocated block according to the present invention may be defined through two methods, as shown in FIG. 4.

Referring to FIG. 4(a), the collocated block may be defined as a block including the position C in the reference picture, which corresponds to the position C of the center pixel of the current texture block. Referring to FIG. 4(b), the collocated block may be defined as a block including the position X in the reference picture, which corresponds to the position X of the left upper pixel of the current texture block. The temporal neighboring block of the present invention is not limited to the collocated block and may refer to a neighboring block adjacent to the collocated block. As shown in FIG. 4(a), at least one of the left lower neighboring block $A_0$, left block $A_1$, right upper neighboring block $B_0$, upper block $B_1$ and left upper neighboring block $B_2$ may be used as the neighboring block adjacent to the collocated block. Furthermore, since the reference picture has been decoded prior to the current picture, a lower neighboring block and a right neighboring block of the collocated block may also be used as temporal neighboring blocks. For example, a right lower neighboring block $C_0$, a lower neighboring block $C_1$ and a right neighboring block $C_2$ can be used as temporal neighboring blocks, as shown in FIG. 4(a). It is possible to search a) a collocated block and b) a neighboring block adjacent to the collocated block, which are regarded as temporal neighboring block candidates, for a block coded according to inter-view inter-prediction in consideration of priority. Specifically, it is determined whether a temporal neighboring block with highest priority is a block coded according to inter-view inter-prediction and, when the temporal neighboring block with the highest priority has not been coded according to inter-view inter-prediction, it is determined whether a temporal neighboring block with next highest priority is a block coded according to inter-view inter-prediction. This operation may be performed until a block coded according to inter-view inter-prediction is detected. For example, priorities of temporal neighboring blocks are assumed as shown in Table 2. The priorities shown in Table 2 are exemplary and the present invention is not limited thereto.

TABLE 2

| Priority | Temporal neighboring block |
|---|---|
| 0 | Collocated block |
| 1 | Neighboring block adjacent to the collocated block |

A description will be given of a process of deriving a reference inter-view motion vector.

When both a spatial neighboring block and a temporal neighboring block are not coded according to inter-view inter-prediction, an inter-view motion vector may be derived using a neighboring block coded according to temporal inter-prediction. When the neighboring block is coded according to temporal inter-prediction using a reference view motion vector, an inter-view motion vector (referred to as a reference inter-view motion vector hereinafter) used to determine the reference view motion vector may be set to an inter-view motion vector of the current texture block.

The neighboring block may be a spatial neighboring block or a temporal neighboring block. Methods of checking whether neighboring blocks have been coded according to temporal inter-prediction may include a method of checking spatial neighboring blocks and then checking temporal neighboring blocks and a method of checking the temporal neighboring blocks and then checking the spatial neighboring blocks. The method of checking the spatial neighboring blocks may be performed by the method described with reference to FIG. 3 and the method of checking the temporal neighboring blocks may be performed by the method described with reference to FIG. 4. A method of detecting a reference inter-view motion vector according to priority will be described with reference to FIG. 7.

A description will be given of a method of checking whether a neighboring block is coded according to temporal inter-prediction. In one embodiment, whether a neighboring block is coded according to temporal inter-prediction is determined on the basis of motion vector identification information of the corresponding neighboring block. When the motion vector identification information indicates a motion vector using temporal inter-prediction, the neighboring block may be regarded as a block coded according to temporal inter-prediction.

Figure 5:
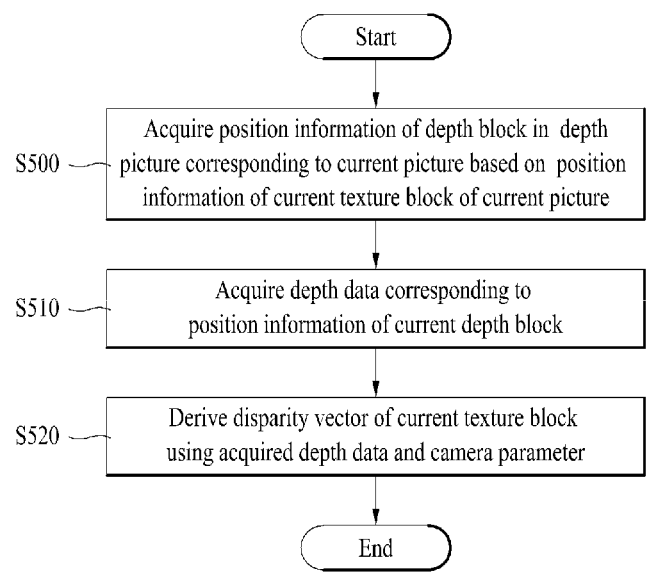
FIG. 5 is a flowchart illustrating a method for deriving a disparity vector of a current texture block using depth data according to an embodiment to which the present invention is applied.

FIG. 5 is a flowchart illustrating a method of deriving a disparity vector of the current texture block using depth data according to an embodiment to which the present invention is applied.

Referring to FIG. 5, position information of a depth block (referred to as a current depth block hereinafter) in a depth picture, which corresponds to the current texture block of the current picture, may be acquired on the basis of position information of the current texture block of the current picture (S500). The position of the current depth block may be determined in consideration of spatial resolutions of the depth picture and the current picture. For example, when the depth picture and the current picture are coded in the same spatial resolution, the position of the current depth block can be determined as the same position as the current texture block of the current picture. The current picture and the depth picture may be coded in different spatial resolutions since coding efficiency is not remarkably deteriorated even when depth information is coded in decreased spatial resolution in terms of characteristics of the depth information indicating a distance between a camera and an object. Accordingly, when the depth picture is coded in spatial resolution lower than that of the current picture, the decoder may upsample the depth picture prior to acquisition of the position information of the current depth block. In addition, when the aspect ratio of the upsampled depth picture is not consistent with the aspect ratio of the current picture, offset information may be additionally considered when the position information of the current depth block is acquired within the upsampled depth picture. Here, the offset information may include at least one of upper offset information, left offset information, right offset information and lower offset information. The upper offset information may refer to a position difference between at least one pixel located at the top of the upsampled depth picture and at least one pixel located at the top of the current picture. The left offset information, right offset information and lower offset information may be defined in the same manner.

Depth data corresponding to the position information of the current depth block may be acquired (S510). When the current depth block includes a plurality of pixels, depth data corresponding to a corner pixel of the current depth block may be used. Otherwise, depth data corresponding to a center pixel of the current depth block may be used. Alternatively, one of a maximum value, minimum value and mode, from among a plurality of pieces of depth data corresponding to the plurality of pixels, may be selectively used and a mean of the plurality of pieces of depth data may be used. The disparity vector of the current texture block may be derived using the acquired depth data and a camera parameter (S520). A detailed method of deriving the disparity vector of the current texture block will now be described with reference to Equations 1 and 2.

$$Z = \frac{1}{\frac{D}{255} \times \left(\frac{1}{Z_{near}} - \frac{1}{Z_{far}}\right) + \frac{1}{Z_{far}}} \quad \text{[Equation 1]}$$

In Equation 1, Z denotes a distance between a corresponding pixel and a camera, D is a value obtained by quantizing Z and corresponds to depth data of the present invention, and $Z_{near}$ and $Z_{far}$ respectively represent a minimum value and a maximum value of Z defined for a view including the depth picture. $Z_{near}$ and $Z_{far}$ may be extracted from a bitstream through a sequence parameter set, a slice header and the like and may be information predetermined in the decoder. Accordingly, when the distance between the corresponding pixel and the camera is quantized at a level of 256, Z can be reconstructed using depth data $Z_{near}$ and $Z_{far}$ as represented by Equation 1. Subsequently, the disparity vector for the current texture block may be derived using reconstructed Z, as represented by Equation 2.

$$d = \frac{f \times B}{Z} \quad \text{[Equation 2]}$$

In Equation 2, f denotes the focal length of a camera and B denotes a distance between cameras. It can be assumed that all cameras have the same f and B, and thus f and B may be information predefined in the decoder.

When only texture data of a multiview image is coded, information about camera parameters cannot be used and thus the method of deriving a disparity vector from depth data cannot be used. Accordingly, a disparity vector map storing disparity vectors may be used when only texture data of a multiview image is coded. The disparity vector map may be a map in which disparity vectors each of which is composed of horizontal components and vertical components are stored in a two-dimensional array. The disparity vector map of the present invention may be represented in various sizes. For example, the disparity vector map can have a size of 1×1 when only one disparity vector is used per picture. When a disparity vector is used per 4×4 block in a picture, the disparity vector map can have a size corresponding to 1/16 of the picture size since the disparity vector map has a width and a height of ¼ of those of the picture. In addition, the size of the current texture block may be adaptively determined in one picture and a disparity vector may be stored per corresponding texture block.

An inter-view motion vector may be derived using a global disparity vector (GDV) derived from the syntax of a slice or a picture. The global disparity vector indicates a different view at which a reference picture is located at the current view in the unit of a slice or a picture including a plurality of blocks. Since the same global disparity vector is derived for a plurality of texture blocks, an offset vector for compensating for motion vectors in order to find a correct reference block may be additionally provided to texture blocks when the texture blocks have different inter-view motion vectors. An inter-view motion vector obtained from a vector sum of the global disparity vector and the offset vector may be included in inter-view motion vector candidates of the current texture block.

Inter-view motion vector candidates of the current text block may include a spatial inter-view motion vector, a temporal inter-view motion vector, a disparity vector and a reference inter-view motion vector and an inter-view motion vector of the current texture block may be derived from one selected from the spatial inter-view motion vector, temporal inter-view motion vector and disparity vector, as described above. A description will be given of a method of deriving the inter-view motion vector of the current texture block from inter-view motion vector candidates.

The inter-view motion vector may be acquired in consideration of priorities of inter-view motion vector candidates of the current texture block. The priorities of the inter-view motion vector candidates may be set, as shown in Table 3.

TABLE 3

| Priority | Category |
|---|---|
| 0 | Spatial inter-view motion vector |
| 1 | Temporal inter-view motion vector |
| 2 | Reference inter-view motion vector |
| 3 | Disparity vector |

In Table 3, a lower priority value refers to a higher priority. That is, the spatial inter-view motion vector may have highest priority and the temporal inter-view motion vector, the reference inter-view motion vector and the disparity vector may have following priorities. A description will be given of a method of deriving an inter-view motion vector when the priories of the inter-view motion vector candidates are set, as shown in Table 3, with reference to FIG. 6.

Table 3 is exemplary and the present invention is not limited thereto. For example, the priorities can be set in the order of the temporal inter-view motion vector, spatial inter-view motion vector, disparity vector and reference inter-view motion vector or in the order of the disparity vector, reference inter-view motion vector, spatial inter-view motion vector and temporal inter-view motion vector. Priority may be set in consideration of the frequency of an inter-view motion vector used for a coded texture block. Otherwise, priority may be set in specific categories. For example, priorities of the spatial inter-view motion vector, temporal inter-view motion vector and reference inter-view motion vector can be set or priorities of the spatial inter-view motion vector and reference inter-view motion vector.

Figure 6:
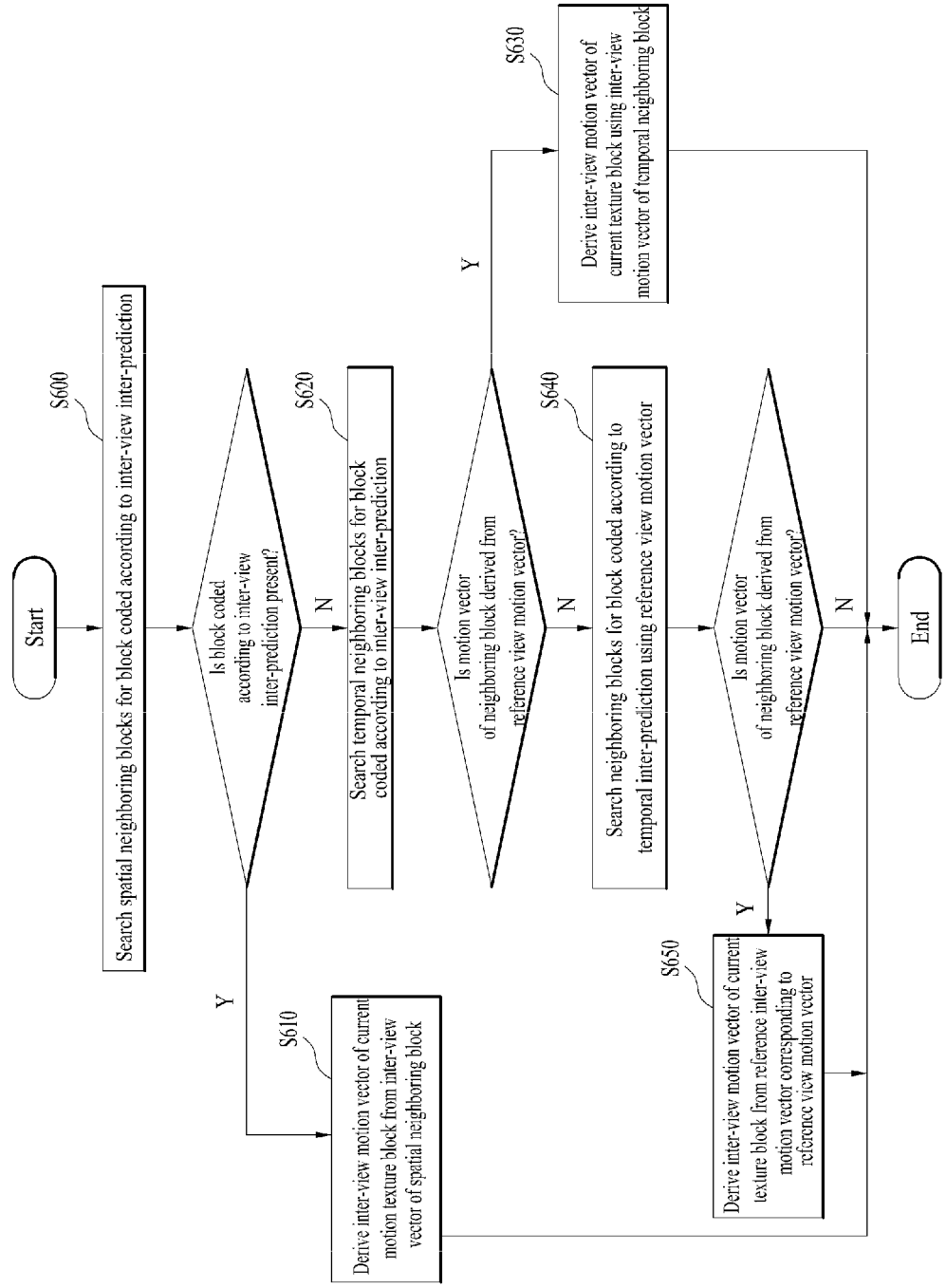
FIG. 6 is a flowchart illustrating a method of deriving an inter-view motion vector from a neighboring block coded according to inter-view inter-prediction on the basis of predetermined priority according to an embodiment to which the present invention is applied.

FIG. 6 illustrates a method of deriving an inter-view motion vector from a neighboring block coded according to inter-view inter-prediction on the basis of predetermined priorities according to an embodiment to which the present invention is applied.

Referring to FIG. 6, spatial neighboring blocks may be searched for a block coded according to inter-view inter-prediction (S600). As described with reference to FIG. 4, priorities of the spatial neighboring blocks may be considered when the spatial neighboring blocks are searched for a block coded according to inter-view inter-prediction. For example, a left lower neighboring block, a left neighboring block, a right upper neighboring block, an upper neighboring block and a left upper neighboring block can be sequentially searched for a block coded according to inter-view inter-prediction. In addition, a) the method of using an inter-view reference picture list, b) the method of using reference index information and c) the method of using identity of POC of a picture including a spatial neighboring block and POC of a reference picture of the spatial neighboring block may be used as a method of determining whether a block is coded according to inter-view inter-prediction.

When the spatial neighboring blocks include a block coded according to inter-view inter-prediction, the inter-view motion vector of the current texture block may be derived from the inter-view motion vector of the corresponding spatial neighboring block (S610). On the contrary, when the spatial neighboring blocks do not include a block coded according to inter-view inter-prediction, temporal neighboring blocks may be searched for a block coded according to inter-view inter-prediction (S620). Temporal neighboring block candidates may include at least one of a) a collocated block and b) a block adjacent to a collocated block, and the temporal neighboring blocks may be searched for a block coded according to inter-view inter-prediction in consideration of priorities of the temporal neighboring block candidates, as described above.

When the temporal neighboring blocks include a block coded according to inter-view inter-prediction, the inter-view motion vector of the current texture block may be derived using the inter-view inter-prediction of the corresponding temporal neighboring block (S630).

When spatial or temporal neighboring blocks are not coded according to inter-view inter-prediction, that is, when the spatial or temporal neighboring blocks are coded according to temporal inter-prediction, if a motion vector of a corresponding neighboring block is derived from a reference view motion vector, then a reference inter-view motion vector corresponding to the reference view motion vector may be derived (S640).

When a motion vector of a block coded according to temporal inter-prediction from among neighboring blocks is derived from a reference view motion vector, the inter-view motion vector of the current texture block may be derived using the reference inter-view motion vector for determining the reference view motion vector (S650).

When temporal neighboring blocks do not include a block coded according to inter-view inter-prediction, the inter-view motion vector may be derived using the disparity vector of the current texture block (S660).

Figure 7:
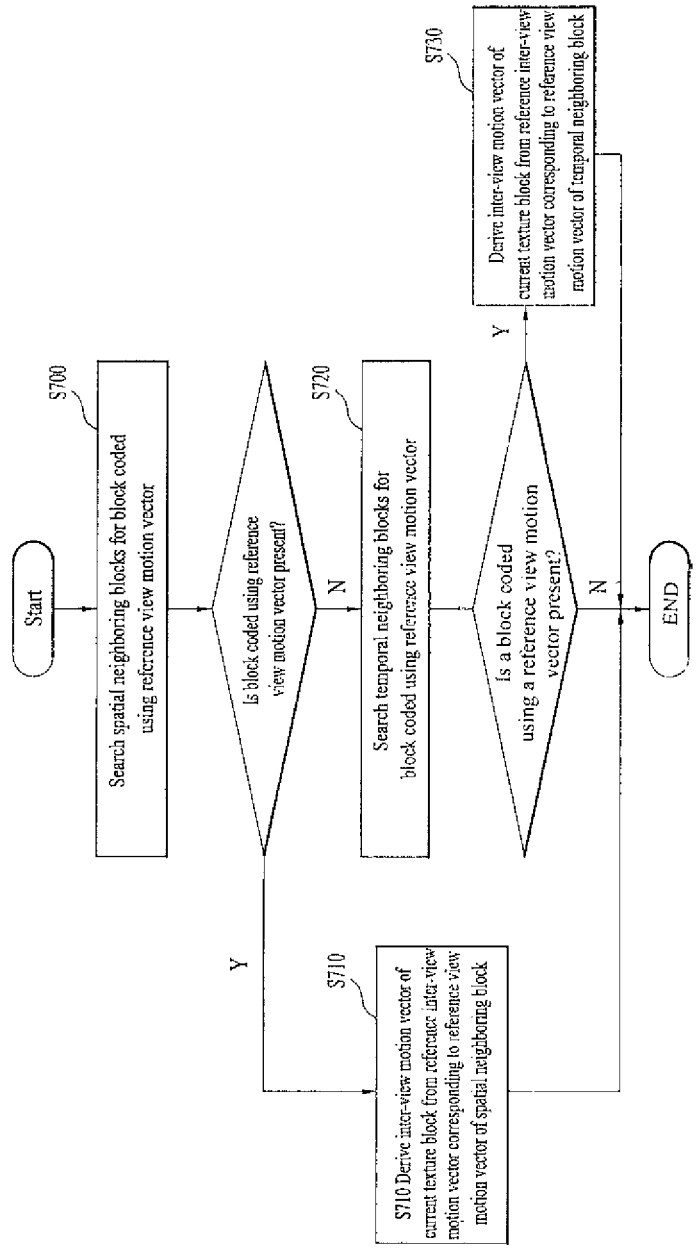
FIG. 7 is a flowchart illustrating a process of searching neighboring blocks in order to acquire a reference inter-view motion vector according to an embodiment to which the present invention is applied.

FIG. 7 is a flowchart illustrating a method of searching neighboring blocks in order to acquire a reference inter-view motion vector.

It is checked whether motion vectors of spatial neighboring blocks of the current texture block are derived from a reference view motion vector (S700). The spatial neighboring blocks may include $C_0$, $C_1$, $D_0$ and $D_{01}$ in addition to $A_0$, $A_1$, $B_0$, $B_1$ and $B_2$ in FIG. 3. The spatial neighboring blocks may be searched in order of $A_1 \rightarrow B_1 \rightarrow B_0 \rightarrow A_0 \rightarrow B_2$ and $C_0$, $C_1$, $D_0$ and $D_1$ may be additionally searched. The searched neighboring blocks and searching order are not limited thereto.

When motion vectors of spatial neighboring blocks are derived from the reference view motion vector, an inter-view motion vector of the current texture block is derived from a reference inter-view motion vector for determining the reference view motion vector (S710).

When there is no motion vector of a spatial neighboring block, which is derived from the reference view motion vector, it is checked whether motion vectors of temporal neighboring blocks are derived from the reference view motion vector (S720).

When motion vectors of temporal neighboring blocks are derived from the reference view motion vector, the inter-view motion vector of the current texture block is derived from the reference inter-view motion vector for determining the reference view motion vector (S730).

Figure 8:
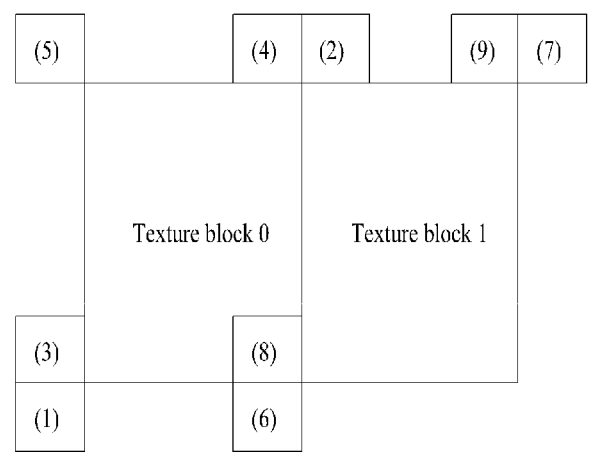
FIG. 8 illustrates an example of deriving an inter-view motion vector through parallel processing according to an embodiment to which the present invention is applied.

FIG. 8 illustrates an example of deriving an inter-view motion vector through parallel processing according to an embodiment to which the present invention is applied.

An inter-view motion vector may be derived through parallel processing of neighboring texture blocks. In other words, an inter-view motion vector of a neighboring texture block having data dependency may not be referred to. Searching neighboring texture blocks may be limited on the basis of a segmentation mode of the current texture block. For example, when the segmentation mode of the current texture block corresponds to a rectangle (e.g. N×2N) in the vertical direction and the current texture block is a texture block (texture block 1) having a block index of 1, as shown in FIG. 8, detection of an inter-view motion vector for neighboring block (8) can be limited. When the inter-view motion vector is derived through parallel processing, however, the number of inter-view motion vector candidates may be reduced. In this case, neighboring block (3) of texture block 0 may be detected to obtain information on the inter-view motion vector. Alternatively, the global disparity vector of neighboring texture blocks may be derived and added to the inter-view motion vector candidates.

When the segmentation mode of the current texture block corresponds to a rectangle (e.g. 2N×N) in the horizontal direction and the current texture block is a texture block (texture block 1) having a block index of 1, detection of an inter-view motion vector for an upper neighboring block can be limited. This is because the upper neighboring block is included in texture block 0 and an inter-view motion vector is not present in texture block 0 according to parallel processing.

Figure 9:
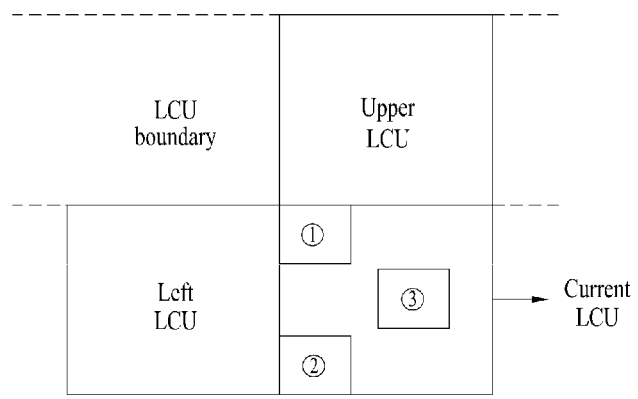
FIG. 9 illustrates an example of determining whether spatial neighboring blocks are searched according to the position of the current texture block according to an embodiment to which the present invention is applied.

FIG. 9 illustrates an example of determining whether to search spatial neighboring blocks on the basis of the position of the current texture block according to an embodiment to which the present invention is applied.

A coding unit refers to a basic unit for processing images in a procedure of processing a video signal, for example, intra- or inter-prediction, transform, quantization and entropy coding or the like. The size of a coding unit used to code one image may not be fixed. One coding unit may be segmented into a plurality of coding units. A decoder may receive information on a largest coding unit LCU and information indicating a difference between the LCU and a smallest coding unit and determine a coding unit size.

Spatial neighboring blocks, which are searched to derive the inter-view motion vector of the current texture block, include upper blocks and left blocks of the current texture block. When the current texture block and a spatial neighboring block are located in the same largest coding unit, the inter-view motion vector of the spatial neighboring block needs to be stored in a temporary memory in order to acquire inter-view motion vectors of spatial neighboring blocks. However, when the current texture block and a spatial neighboring block are located in different largest coding units, the inter-view motion vector of the spatial neighboring block may be limited such that the inter-view motion vector of the current texture block is not derived from the inter-view motion vector of the spatial neighboring block. To this end, storage of the inter-view motion vector of the corresponding spatial neighboring block in the temporary memory may be omitted. Storage of inter-view motion vectors of only upper neighboring blocks of the current texture block, from among the spatial neighboring blocks, in the temporary memory may be omitted. The temporary memory may be provided per line of a picture. In this case, a temporary memory corresponding to a line to which the spatial neighboring block belongs is unnecessary and thus may be removed.

As shown in FIG. 9, when the current texture block is located at the left upper part of the current LCU ($\hat{1}$), it is possible to check whether a neighboring block belonging to a left LCU located at the left of the current texture block is coded according to an inter-view motion vector or a reference view motion vector and to check whether a neighboring block belonging to an upper LCU located at the top of the current texture block is coded according to the inter-view motion vector. When the current texture block is located at the left lower part of the current LCU ($\hat{2}$), neighboring blocks may be searching using information on a neighboring block belonging to left LCU located at the left of the current texture block and current LCU may be detected. When the current texture block is located in the current LCU (($\hat{3}$)), searching may be performed using only information on current LCU.

Figure 10:
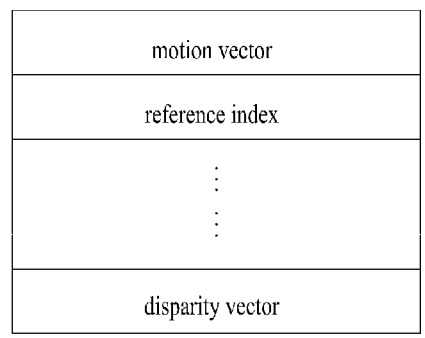
FIG. 10 illustrates a motion information packet on a coding block basis according to an embodiment to which the present invention is applied.

FIG. 10 illustrates a motion information packet in a coding block.

A reference inter-view motion vector is an inter-view motion vector which was used in a procedure of deriving a reference view motion vector. When the reference view motion vector has high reliability, this means that the reference inter-view motion vector has been correctly derived and thus the reference inter-view motion vector can be usefully used, as shown in FIG. 7. Accordingly, when reference inter-view motion vectors are coded in a distributed manner per coding block, it is possible to further improve decoding accuracy while reducing memory congestion.

As described above, the decoding/encoding device to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code a video signal.

The invention claimed is:

1. A method for processing a video signal by a decoding apparatus, comprising:
   deriving, by the decoding apparatus, an inter-view motion vector of a current texture block from one of inter-view motion vector candidates of the current texture block based on priority order of the inter-view motion vector candidates; and
   performing, by the decoding apparatus, inter-view inter-prediction on the current texture block using the derived inter-view motion vector,
   wherein the inter-view motion vector candidates include at least one of inter-view motion vectors of spatial neighboring blocks, inter-view motion vectors of temporal neighboring blocks and a zero motion vector,
   wherein the priority order is in the following order: (1) the inter-view motion vectors of the temporal neighboring blocks, (2) the inter-view motion vectors of the spatial neighboring blocks, (3) the zero motion vector,
   wherein the deriving the inter-view motion vector of the current texture block based on the priority order comprises:
   determining, by the decoding apparatus, whether the temporal neighboring blocks are coded using the inter-view motion vector;
   deriving, by the decoding apparatus, the inter-view motion vector of the current texture block as the inter-view motion vector of one of the temporal neighboring blocks when the temporal neighboring blocks are coded using the inter-view motion vector;
   determining, by the decoding apparatus, whether the spatial neighboring blocks are coded using the inter-view motion vector when the temporal neighboring blocks are not coded using the inter-view motion vector;
   deriving, by the decoding apparatus, the inter-view motion vector of the current texture block as the inter-view motion vector of one of the spatial neighboring blocks when the spatial neighboring blocks are coded using the inter-view motion vector;
   deriving, by the decoding apparatus, the inter-view motion vector of the current texture block as the zero motion vector when the spatial neighboring blocks are not coded using the inter-view motion vector.

2. The method according to claim 1, wherein the spatial neighboring blocks include at least one of a left lower neighboring block, a left neighboring block, a right upper neighboring block, an upper neighboring block and a left upper neighboring block of the current texture block.

3. The method according to claim 2, wherein the spatial neighboring blocks are searched on the basis of priority thereof, wherein the spatial neighboring blocks have priorities in descending order of left neighboring block and upper neighboring block.

4. The method according to claim 1, wherein the temporal neighboring blocks include at least one of a collocated block and a neighboring block adjacent to the collocated block.

5. An apparatus for processing a video signal, comprising:
an inter-prediction unit configured to derive an inter-view motion vector of a current texture block from one of inter-view motion vector candidates of the current texture block based on priority order of the inter-view motion vector candidates and to perform inter-view inter-prediction on the current texture block using the derived inter-view motion vector,
wherein the inter-view motion vector candidates include at least one of inter-view motion vectors of spatial neighboring blocks, inter-view motion vectors of temporal neighboring blocks and a zero motion vector,
wherein the priority order is in the following order: (1) the inter-view motion vectors of the temporal neighboring blocks, (2) the inter-view motion vectors of the spatial neighboring blocks, (3) the zero motion vector,
wherein the inter-prediction unit determines whether the temporal neighboring blocks are coded using the inter-view motion vector, derives the inter-view motion vector of the current texture block as the inter-view motion vector of one of the temporal neighboring blocks when the temporal neighboring blocks are coded using the inter-view motion vector, determines whether the spatial neighboring blocks are coded using the inter-view motion vector when the temporal neighboring blocks are not coded using the inter-view motion vector, derives the inter-view motion vector of the current texture block as the inter-view motion vector of one of the spatial neighboring blocks when the spatial neighboring blocks are coded using the inter-view motion vector and derives the inter-view motion vector of the current texture block as the zero motion vector when the spatial neighboring blocks are not coded using the inter-view motion vector.

6. The apparatus according to claim 5, wherein the spatial neighboring blocks include at least one of a left lower neighboring block, a left neighboring block, a right upper neighboring block, an upper neighboring block and a left upper neighboring block of the current texture block.

7. The apparatus according to claim 6, wherein the spatial neighboring blocks are searched on the basis of priority thereof, wherein the spatial neighboring blocks have priorities in descending order of left neighboring block and upper neighboring block.

8. The apparatus according to claim 5, wherein the temporal neighboring blocks include at least one of a collocated block and a neighboring block adjacent to the collocated block.

* * * * *